Jan. 31, 1961        W. BLOCKER        2,969,914
POLYNOMIAL DIVIDER

Filed Feb. 6, 1956        2 Sheets-Sheet 1

INVENTOR.
W. BLOCKER
BY
Hudson & Young
ATTORNEYS

Jan. 31, 1961  W. BLOCKER  2,969,914
POLYNOMIAL DIVIDER
Filed Feb. 6, 1956  2 Sheets-Sheet 2

INVENTOR.
W. BLOCKER
BY Hudson & Young
ATTORNEYS

United States Patent Office 2,969,914
Patented Jan. 31, 1961

2,969,914

POLYNOMIAL DIVIDER

Wade Blocker, Bartlesville, Okla., assignor to Phillips Petroleum Company, a corporation of Delaware Filed Feb. 6, 1956, Ser. No. 563,499

15 Claims. (Cl. 235—180)

This invention relates to the division of functions which can be expressed as mathematical polynomials.

In various fields of physical measurement and analysis, the data under consideration can be expressed in the general form of an algebraic polynomial of the type $$F(x) = a_0 + a_1 x + a_2 x^2 + \ldots + a_n x^n \quad (1)$$

where the coefficients $a_0$, $a_1$, $a_2$ ... $a_n$ represent the magnitudes of the individual quantities under consideration and the quantities $x$, $x^2$ ... $x^n$ represent time, space or the like at which the respective coefficients $a_1$, $a_2$, ... $a_n$ are obtained with respect to a reference point associated with the coefficient $a_0$. The exponents attached to the several $x$'s serve to identify the time, space or the like at which the respective coefficients are taken. For example, an electrical voltage sine wave of $\pi$ period and unity maximum value can be expressed as follows:

$$0 + 0.7x + 1.0x^2 + 0.7x^3 + 0x^4 - 0.7x^5$$
$$-1.0x^6 - 0.7x^7 + 0x^8 \quad (2)$$

wherein the coefficients 0.7, 1.0, 0.7, 0, −0.7, −1.0, −0.7 and 0 represent the amplitudes of the wave form at respective phase angles of $\pi/8$, $\pi/4$, $3\pi/8$, $\pi/2$, $5\pi/8$, $3\pi/4$, $7\pi/8$ and $\pi$, which in turn are represented by the respective quantities $x$, $x^2$, $x^3$, $x^4$, $x^5$, $x^6$, $x^7$ and $x^8$. By increasing the number of $x$ values within the period $\pi$, the sine curve can be expressed to any desired degree of accuracy. Obviously any other mathematical curve, the magnitude of which varies with time, can be expressed in like manner. An example wherein a physically measured quantity varies with respect to displacement occurs in well logging. A sonde is lowered into a bore hole to measure some property of the surrounding earth formations. In order to interpret such data, the output of the sonde normally is recorded as a function of the depth at which the sonde is lowered. Such a record can be expressed mathematically, for example, as follows:

$$0 + 1.0x + 2.5x^2 + 2.0x^3 + 2.6x^4 +$$
$$3.0x^5 + \ldots + 1.7x^n \quad (3)$$

where the coefficients 1.0, 2.5, 2.0, 2.6, 3.0 ... 1.7 represent the magnitude of the selected property at uniformly increasing depths represented by the respective quantities $x$, $x^2$, $x^3$, $x^4$ ... $x^n$. These two examples are illustrative of the fact that any information which can be expressed in the form of a mathematical curve can also be expressed as an algebraic polynomial, the degree of accuracy of such expression being limited only by the number of values selected within the range of the curve. The division of such polynomials finds many applications in servo systems and solving differential equations.

In accordance with the present invention, a system is provided for representing mathematical data in the form of algebraic polynomials and for dividing such polynomials. This division can be accomplished by the use of recently developed apparatus which is capable of multiplying one polynomial by another. Several forms of this apparatus are described in the copending application of R. G. Piety, Serial No. 553,626, filed December 16, 1955, now Patent No. 2,908,889, and the copending application of J.P. Greening and W. Blocker, Serial No. 533,318, filed December 15, 1955.

The present invention provides apparatus to divide a first polynomial by a second polynomial. The first polynomial is applied through an operational amplifier to the input of a polynomial multiplier. The output of the multiplier is applied through a feedback network to the input of the operational amplifier. The quotient is obtained from the output of the operational amplifier.

Accordingly, it is an object of this invention to provide apparatus for dividing algebraic polynomials.

Another object is to provide apparatus for expressing data in the form of an electrical signal representative of an algebraic polynomial and for performing mathematical operations on the signal.

Other objects, advantages and features of this invention should become apparent from the following detailed description taken in conjunction with the accompanying drawing in which.

Figure 1:
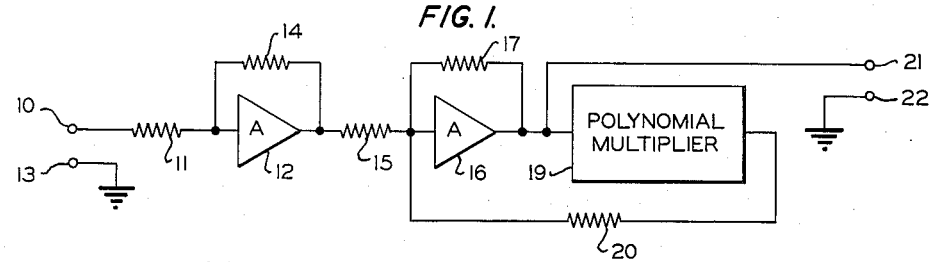
Figure 1 is a schematic representation of a first embodiment of the polynomial dividing apparatus of this invention.

The dividing apparatus of this invention can best be explained by reference to the generating functions of Laplace. The function $$A(x) = \Sigma_n a_n x^n \quad (4)$$

is by definition the generating function of the sequence of numbers $a_n$. The sequence can be infinite to the right or left. The sequence can consist of the values of the time function $a(t)$ at successive intervals $h$ of time. Accordingly, $$A(x) = \Sigma_n a(nh) x^n \quad (5)$$

The symbol G can represent the operation of forming the generating function representation of a function. Thus, $$Ga(t) = A(x) = \Sigma_n a(nh) x^n \quad (6)$$

For simplicity, let $a(nh)$ be written as $a_n$ so that $$A(x) = Ga(t) = \Sigma_n a_n x^n \quad (7)$$

Since the start of an analog computation is not infinitely far back in the past, it is advantageous to take zero as the starting point and write the generating function as $$A(x) = \sum_{n=0}^{N} a_n x^n \quad (8)$$

or $$A(x) = a_0 + a_1 x + a_2 x^2 + \ldots + a_N x^N \quad (9)$$

Expression 9 is the generating function representative of a time sequence of coefficients $(a_0, a_1, a_2, \ldots, a_N)$ where the number $n$ appearing as the power of $x$ defines the position of a particular coefficient in the time sequence. $A(x)$ can also be considered as a polynomial in $x$, $$\sum_{n=0}^{N} a_n x^n \quad (10)$$

This invention makes use of a polynomial multiplier which can be symbolized as a device $$\rightarrow \boxed{Q(x)} \rightarrow \quad (11)$$

the generating function of whose time response to an input pulse of unit width and unit height is $Q(x)$ and for which the generating function of the time response to an input whose generating function is $P(x)$ is $P(x)Q(x)$. If the polynomial multiplier is a pulse type machine, the output for an input pulse of unit width and height is the sequence of pulses of unit width and of heights $(q_0, q_1, q_2, \ldots)$. The response to a sequence of pulses of unit width and of heights $(p_0, p_1, p_2, \ldots)$ is the sequence of pulses of unit width and of heights $[(p_0q_0), (p_0q_1+p_1q_0), (p_0q_2+p_1q_1+p_2q_0), \ldots]$. This is equivalent to multiplying the polynomial $$P(x) = p_0 + p_1 x + p_2 x^2 + \ldots \quad (12)$$

by the polynomial $$Q(x) = q_0 + q_1 x + q_2 x^2 + \ldots \quad (13)$$

which gives the product $$P(x)Q(x) = p_0q_0 + (p_0q_1+p_1q_0)x + (p_0q_2+p_1q_1+p_2q_0)x^2 + \ldots \quad (14)$$

Referring now to the drawing in detail and to Figure 1 in particular, there is shown a first embodiment of the polynomial divider of this invention. The first input terminal 10 is connected through a resistor 11 to the input terminal of an operational amplifier 12. The second input terminal 13 is connected to ground. A feedback resistor 14 is connected between the output and input terminals of amplifier 12. The output terminal of amplifier 12 is connected through a resistor 15 to the input terminal of a second operational amplifier 16. A feedback resistor 17 is connected between the output and input terminals of amplifier 16. The output terminal of amplifier 16 is applied to the input terminal of a polynomial multiplier 19. A feedback resistor 20 is connected between the output terminal of multiplier 19 and the input terminal of amplifier 16. The output terminal of amplifier 16 is also connected to the first output terminal 21 of the divider network. The second output terminal 22 is connected to ground.

Operational amplifiers 12 and 16 are adapted to provide output signals of the same amplitude as the input signals, but of reversed polarity. These amplifiers thus provide unity gain with a sign reversal. A suitable amplifier for this purpose is illustrated schematically in Figure 2. The input terminal 25 is connected to the control grid of a triode 26. The cathode of triode 26 is connected to a negative potential terminal 27 through a resistor 28, and the anode of triode 26 is connected to a positive potential terminal 29 through a resistor 30. A potentiometer 31 is connected between the anode of triode 26 and terminal 27. The contactor of potentiometer 31 is connected to the control grid of a triode 32. The cathode of triode 32 is connected to ground, and the anode of triode 32 is connected to terminal 29 through a resistor 33. The anode of triode 32 is connected to the control grid of a pentode 35 through a resistor 36. The control grid of pentode 36 is conencted to terminal 27 through a resistor 38. The cathode and the suppressor grid of pentode 35 are connected to terminal 27 through a resistor 39. The screen grid and the anode of pentode 35 are connected to terminal 29 through a resistor 40. The anode of pentode 35 is connected to an output terminal 41.

Figure 2:
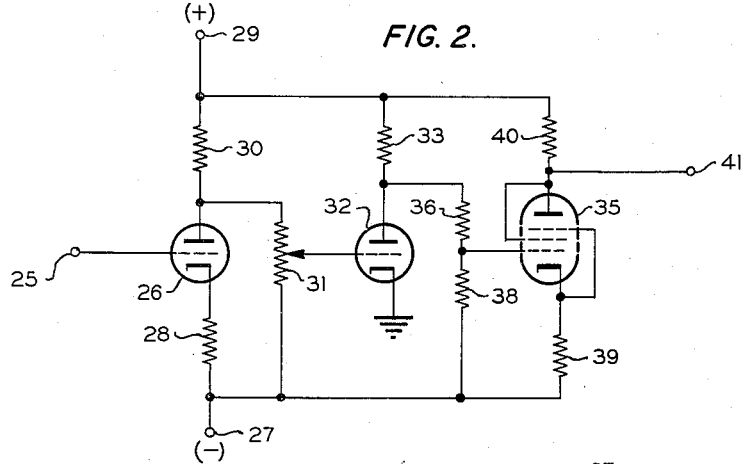
Figure 2 is a schematic view of an operational amplifier which can be employed in the apparatus of Figure 1.

The amplifier illustrated in Figure 2 thus comprises a three-stage D.C. amplifier. It should be noted, however, that the three stages provide a sign reversal. For example, if the input signal should increase, the output signal decreases.

Figure 3:
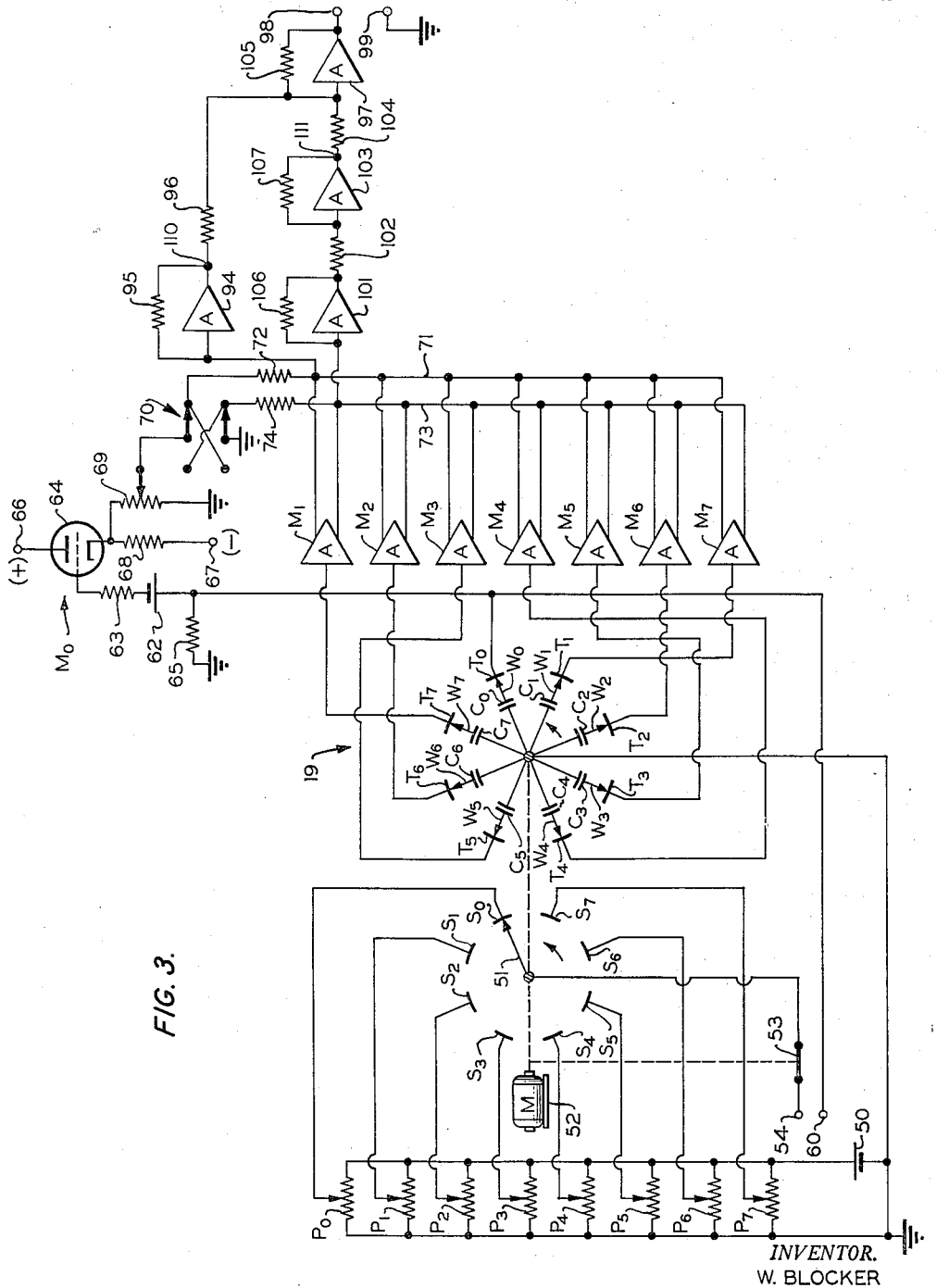
Figure 3 is a schematic view of a signal generator and polynomial multiplier which can be employed in the apparatus of Figure 1.

In Figure 3 there is shown the combination of a function generator and polynomial multiplier. If the polynomial to be divided is originally in the form of an electrical signal of varying amplitude, there is no need to employ the function generator of Figure 3. However, in a number of mathematical operations it is necessary to provide an electrical signal which is representative of the polynomial to be divided. For purposes of discussion it will be assumed that this polynomial is of the form of Equation 12. A plurality of potentiometers $P_0$, $P_1$, $P_2$ ... $P_7$ are connected in parallel with one another. A voltage source 50 is applied across these potentiometers, the negative terminal of voltage source 50 being connected to ground. The contactors of potentiometers $P_0$, $P_1$, $P_2$ ... $P_7$ are connected to respective stationary contacts $S_0$, $S_1$, $S_2$ ... $S_7$. A switch arm 51 is rotated by a motor 52 so as to engage these contacts in sequence. Switch arm 51 is connected through a switch 53 to an output terminal 54. Switch 53 is connected to motor 52 so as to be opened after one complete revolution of switch arm 51. The purpose of this switch is described hereinafter.

When it is desired to generate an electrical signal representative of the polynomial of Equation 12, the contactors of the potentiometers are set so that the voltages at the contactors of potentiometers $P_0$, $P_1$, $P_2$ ... $P_7$ are representative of the respective coefficients $p_0$, $p_1$, $p_2$ ... $p_7$. Obviously if a larger number of coefficients are present in the polynomial to be divided, a greater number of potentiometers and switch contacts can be provided. It should be evident that the potential appearing at terminal 54 thus acquires the values of the coefficients of the polynomial as switch arm 51 engages the several S contacts in sequence.

For purposes of discussion it is assumed that all of the coefficients of the polynomial of Equation 12 are positive. If any of the coefficients are negative, a second voltage source can be provided with switching means as to be connected across the individual potentiometers representative of the negative coefficients. This second voltage source would be connected across the potentiometers with polarity reversed to the polarity of voltage source 50.

Terminal 60 of Figure 3 provides the input terminal of polynomial multiplier 19. This terminal is connected to a stationary contact $T_0$. Additional stationary contacts $T_1$, $T_2$ ... $T_7$ are arranged in a circular path. A plurality of capacitors $C_0$, $C_1$, $C_2$ ... $C_7$ are mounted on a member which is rotated by motor 52. The first terminals of these capacitors are connected to one another and to ground. The second terminals of these capacitors are connected to respective switch arms $W_0$, $W_1$, $W_2$ ... $W_7$. In the illustrated position, these switch arms engage respective contacts $T_0$, $T_1$, $T_2$ ... $T_7$. As the capacitor unit is rotated, the switch arms engage adjacent contacts in succession. Contacts $T_0$, $T_7$, $T_6$ ... $T_1$ are connected to the input terminals of respective amplifiers $M_0$, $M_1$, $M_2$ ... $M_7$.

Amplifier $M_n$ is illustrated in detail. Contact $T_0$ is connected to the positive terminal of a voltage source 62. The negative terminal of voltage source 62 is connected through a resistor 63 to the control grid of a triode 64. A resistor 65 is connected between the positive terminal of voltage source 62 and ground. The anode of triode 64 is connected to a positive potential terminal 66. The cathode of triode 64 is connected to a negative potential terminal 67 through a resistor 68. The cathode of triode 64 is also connected to the first end terminal of a potentiometer 69. The second end terminal of potentiometer 69 is connected to ground. The contactor of potentiometer 69 is connected to the first arm of a double-pole, double-throw reversing switch 70. The second arm of this switch is connected to ground. One terminal of switch 70 is connected to a lead 71 through a resistor 72, and the second terminal of switch 70 is connected to a lead 73 through a resistor 74.

Lead 71 is connected to the input of an amplifier 94. The output of amplifier 94 is connected through a resistor 96 to the input of an amplifier 97. The output of amplifier 97 is connected to a first output terminal 98, the second output terminal 99 being grounded. Lead 73 is connected to the input of an amplifier 101. The output of amplifier 101 is connected through a resistor 102 to the input of an amplifier 103. The output of amplifier 103 is connected through a resistor 104 to the input of amplifier 97. Amplifiers 94, 97, 101 and 103 are provided with feedback resistors 95, 105, 106 and 107, respectively. Amplifiers 94, 97, 101 and 103 can be of the type illustrated in Figure 2. Resistor 95 is equal to resistor 72; resistor 106 is equal to resistor 74; resistor 102 is equal to resistor 107; and resistor 96 is equal to resistor 104. Resistor 105 is selected to correct for the scaling factor used in establishing coefficients on the potentiometers such as 69.

In order to explain the operation of the polynomial multiplier illustrated in Figure 3, it will be assumed that terminals 54 and 60 are connected. It is assumed that the initial charges on the capacitors $C_0$, $C_1$, $C_2$ ... $C_7$ are all zero. It is also assumed that the network is to multiply a polynomial of the form shown in Equation 12 by a polynomial of the form shown in Equation 13. The coefficient $q_0$ is set by adjusting the contactor of potentiometer 69. This results in the potential across the potentiometer being multiplied by a value representative of the coefficient $q_0$. If the coefficient $q_0$ is positive, switch 70 can occupy the illustrated position. If the coefficient is negative the switch is reversed. The coefficients $q_1$, $q_2$ ... $q_7$ are set in like manner on the corresponding potentiometers in the circuits of respective amplifiers $M_1$, $M_2$ ... $M_7$.

In the initial position of the switch elements, a potential representative of the coefficient $p_0$ is applied to capacitor $C_0$ and to the input of amplifier $M_0$. Amplifier $M_0$ comprises a cathode follower of unity gain so that the potential at lead 71 is representative of the product of $p_0$ and $q_0$. At the next instant of time the switches move so that switch arm 51 engages contact $S_1$ and switch arm $W_0$ engages contact $T_7$. The voltage $p_1$ is applied to the input of amplifier $M_0$ and to capacitor $C_1$. At the same time the voltage $p_0$ initially on capacitor $C_0$ is applied to the input of amplifier $M_1$. The voltage at lead 110 is thus equal to the negative of the sum of the products $(p_1 \cdot q_0)$ and $(p_0 \cdot q_1)$. This same procedure continues as the switch elements are rotated. If any of the products are negative, the corresponding voltages appear at lead 111. These output voltages are summed so that the final output voltage at 98 is equal to the difference of the sums of the products. Switch 53 is opened at the end of the first rotation of switch arm 51 to prevent a repetition of the $p$ voltages being applied to the capacitors. It requires two rotations of the capacitor unit to complete the multiplication process.

In describing the operation of the polynomial divider of this invention, reference will be made hereinafter to the division of a polynomial $P(x)$ by a polynomial $Q(x)$ to obtain the quotient $R(x)$. These two polynomials $P(x)$ and $Q(x)$ are of the form of Equations 12 and 13, respectively. Referring again to Figure 1, an electrical signal representing the polynomial $P(x)$ is applied between input terminals 10 and 13. This polynomial can be obtained from the network shown in the left-hand side of Figure 3, for example. Polynomial multiplier 19 is set to multiply the input signal applied thereto by the quantity $[-1+Q(x)]$. The potentiometer 69 of amplifier $M_0$ is set in accordance with the term $(-1+q_0)$. The coefficients $q_1$, $q_2$ ... of $Q(x)$ are set on the respective potentiometers of amplifiers $M_1$, $M_2$, $M_3$ ... Resistors 11 and 14 are selected so as to be equal to one another, and can conveniently be of the order of 100,000 ohms each, for example. Resistors 15, 17 and 20 are also equal to one another and can be of the same order of magnitude. Under these conditions, the potential at the output terminal of amplifier 12 is equal to $-P(x)$.

The potential $R(x)$ at terminal 21 is represented by the following expression:

$$R(x) = P(x) - R(x)[-1+Q(x)] = \frac{P(x)}{Q(x)} \quad (15)$$

The network of Figure 1 thus provides the desired division of the two polynomials.

The two polynomials can also be divided by the network of Figure 1 if resistor 14 is selected so as to be equal to the resistance of resistor 11 divided by $Q_0$, resistor 17 is selected so as to be equal to resistor 20 divided by $Q_0$, resistors 15 and 17 are equal to one another, and polynomial multiplier 19 is set to multiply the input signal applied thereto by the expression $[-Q_0+Q(x)]$. This is accomplished by setting the term $[-Q_0+Q(x)]=0$ on potentiometer $Q_0$. Under these conditions the potential at the output terminal of amplifier 12 is equal to $P(x)$ divided by $Q_0$. The potential at terminal 21 is represented by the following expression:

$$R(x) = \frac{P'(x)}{Q_0} - \frac{R(x)}{Q_0}[-Q_0+Q(x)] = \frac{P'(x)}{Q(x)} \quad (16)$$

Figure 4:
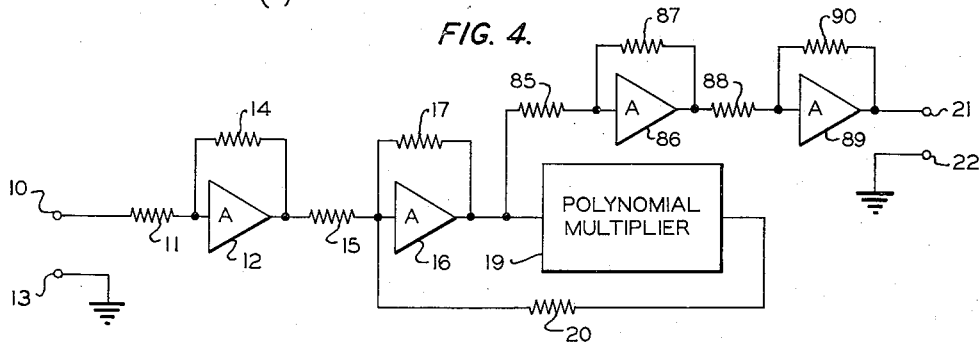
Figure 4 is a schematic representation of a second embodiment of the polynomial dividing apparatus of this invention.

A second embodiment of the polynomial dividing apparatus is illustrated in Figure 4 wherein corresponding elements are designated by like reference numerals. The output terminal of amplifier 16 is connected through a resistor 85 to the input terminal of a unity gain operational amplifier 86. A feedback resistor 87 is connected between the output and input terminals of amplifier 86. The output terminal of amplifier 86 is connected through a resistor 88 to the input terminal of a unity gain operational amplifier 89. A feedback resistor 90 is connected between the output and input terminals of amplifier 89. The output terminal of amplifier 89 is connected to terminal 21. Amplifiers 86 and 89 can also be of the form illustrated in Figure 2.

In one application of the circuit of Figure 4, polynomial multiplier 19 is set to multiply by the expression $[-Q_0+Q(x)]$, resistors 11 and 14 are equal to one another, as are resistors 15 and 17, resistor 17 is equal to resistor 20 divided by $Q_0$ resistors 85 and 87 are equal to one another, and resistor 90 is equal to resistor 88 divided by $Q_0$. The potential $R'(x)$ at the output terminal of amplifier 16 is represented by the following expression:

$$R'(x) = P(x) - \frac{R'(x)}{Q_0}[-Q_0+Q(x)] = \frac{P(x)Q_0}{Q(x)} \quad (17)$$

The potential $R(x)$ at terminal 21 is thus equal to the expression:

$$R(x) = R'(x) \cdot \frac{1}{Q_0} = \frac{P'(x)}{Q(x)} \quad (18)$$

In a second embodiment of the apparatus of Figure 4, multiplier 19 is set to multiply by the expression $$\left[-1+\frac{Q(x)}{Q_0}\right]$$

and the values of the resistors are the same as previously described except that resistors 17 and 20 are equal to one another. Under these conditions the potential $R'(x)$ at the output terminal of amplifier 16 is represented by the expression:

$$R'(x) = P(x) - R'(x)\left[-1+\frac{Q'(x)}{Q_0}\right] = \frac{P(x)Q_0}{Q(x)} \quad (19)$$

The potential $R(x)$ at terminal 21 is represented by the expression:

$$R(x) = R'(x) \cdot \frac{1}{Q_0} = \frac{P(x)}{Q(x)} \quad (20)$$

Figure 5:
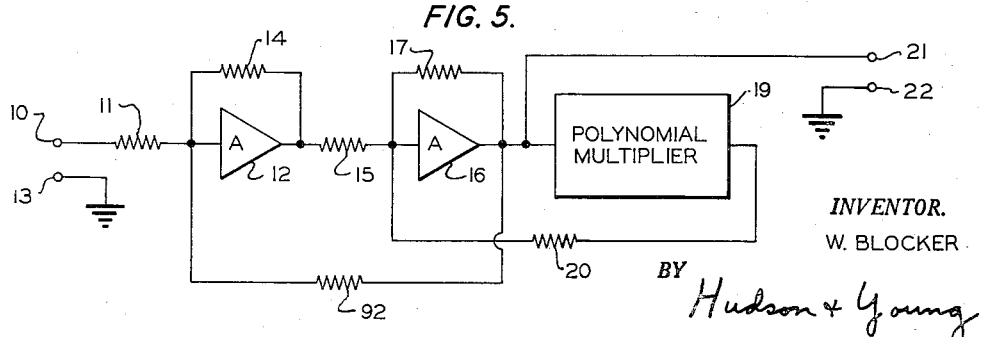
Figure 5 is a schematic representation of a third embodiment of the polynomial dividing apparatus of this invention.

A third embodiment of the polynomial dividing apparatus is illustrated in Figure 5. A feedback resistor 92 is connected between the output terminal of amplifier 16 and the input terminal of amplifier 12. In this particular configuration the polynomial $Q(x)$ is set directly in multiplier 19. Resistors 11, 14 and 92 are equal to one another, as are resistors 15, 17 and 20. Under these conditions the potential at terminal 21 is represented by the expression:

$$R(x) = P(x) + R(x) - R(x)Q(x) = \frac{P(x)}{Q(x)} \quad (21)$$

In view of the foregoing description it should be evident that there is provided in accordance with this invention several embodiments of polynomial dividing apparatus which incorporates a polynomial multiplier and a feedback network. The relative values of the feedback elements and the settings of the multiplier can be set in several manners to provide the desired division. While the invention has been described in conjunction with several present preferred embodiments it should be evident that it is not limited thereto.

What is claimed is:

1. Apparatus for dividing a first polynomial by a second polynomial comprising means for establishing a first electrical signal representative of the first polynomial, a first sign reversal unity gain operational amplifier, a second sign reversal unity gain operational amplifier, means to apply said first signal to the input of said first amplifier, means applying the output of said first amplifier to the input of said second amplifier, means to multiply an electrical signal representative of a polynomial by another polynomial, means to apply the output of said second amplifier to the input of said means to multiply, feedback means to apply the output of said means to multiply to the input of said second amplifier, and feedback means to apply the output of said second amplifier to the input of said first amplifier, the output signal of said second amplifier being representative of the quotient of the first polynamial divided by the second polynomial.

2. Apparatus for dividing a first polynomial $P(x)$ by a second polynomial $Q(x)$ to obtain the quotient $R(x)$ which comprises means for establishing a first electrical signal representative of $P(x)$, a first sign reversal unity gain amplifier having a first input resistor and a second feedback resistor, means to apply said first signal to the input of said first amplifier through said first resistor, a second sign reversal unity gain amplifier having a third feedback resistor, a fourth resistor connected between the output of said first amplifier and the input of said second amplifier, means to multiply an electrical signal representative of a polynomial by the polynomial $Q(x)$, means to apply the output signal of said second amplifier to the input of said means to multiply, a fifth resistor connected between the output of said means to multiply and the input of said second amplifier, and a sixth resistor connected between the output of said second amplifier and the input of said first amplifier, said first, second and sixth resistors being equal, and said third, fourth and fifth resistors being equal, the output of said second amplifier being representative of $R(x)$.

3. Apparatus for dividing a first polynomial by a second polynomial comprising means for establishing a first electrical signal which is a function of the first polynomial; an operational amplifier; means to apply said first signal to the input terminals of said amplifier; means to multiply an electrical signal which is a function of a polynomial by a quantity which is a function of the second polynomial comprising a plurality of voltage multiplying means, a plurality of electrical signal storage means, input terminals, means applying said input terminals successively to said storage means, means to connect said plurality of storage means successively to respective ones of said voltage multiplying means, output terminals, and means to sum the outputs of said voltage multiplying means and to apply same to said output terminals; means to apply the output terminals of said amplifier to the input terminals of said means to multiply; and feedback means to apply the output terminals of said means to multiply to the input terminals of said amplifier, the output signal of said amplifier being representative of the quotient of the first polynomial divided by the second polynomial.

4. The combination in accordance with claim 3 wherein said means for establishing a first electrical signal comprises a plurality of potentiometers, means applying potentials across the end terminals of said potentiometers, a plurality of contacts connected to respective contactors of said potentiometers, a brush, and means to move said brush into engagement with said contacts in sequence.

5. The combination in accordance wtih claim 3 wherein said signal storage means comprise electrical condensers having corresponding first terminals connected to a reference potential, the signals to be stored being applied to the second terminals of the condensers.

6. Apparatus for dividing a first polynomial by a second polynomial comprising means for establishing a first electrical signal representative of the first polynomial; a first sign reversal unity gain operational amplifier; a second sign reversal unity gain operational amplifier; means to apply said first signal to the input terminals of said first amplifier; means applying the output terminals of said first amplifier to the input terminals of said second amplifier; means to multiply an electrical signal representative of a polynomial by another polynomial comprising a plurality of voltage multiplying means, a plurality of electrical signal storage means, input terminals, means applying said input terminals successively to said storage means, means to connect said plurality of storage means successively to respective ones of said voltage multiplying means, output terminals, and means to sum the outputs of said voltage multiplying means and to apply same to said output terminals; means to apply the output terminals of said second amplifier to the input terminals of said means to multiply; and feedback means to apply the output terminals of said means to multiply to the input terminals of said second amplifier; the output signal of said second amplifier being representative of the quotient of the first polynomial divided by the second polynomial.

7. Apparatus for dividing a first polynomial by a second polynomial comprising means for establishing a first electrical signal representative of the first polynomial; a first signal reversal unity gain operational amplifier; a second sign reversal unity gain operational amplifier; means to apply said first signal to the input terminals of said first amplifier; means applying the output terminals of said first amplifier to the input terminals of said second amplifier; means to multiply an electrical signal representative of a polynomial by another polynomial comprising a plurality of voltage multiplying means, a plurality of electrical signal storage means, input terminals, means applying said input terminals successively to said storage means, means to connect said plurality of storage means successively to respective ones of said voltage multiplying means, output terminals, and means to sum the outputs of said voltage multiplying means and to apply same to said output terminals; means to apply the output terminals of said second amplifier to the input terminals of said means to multiply; means to apply the output terminals of said means to multiply to the input terminals of said second amplifier; a third sign reversal unity gain amplifier having the input terminals thereof connected to the output terminals of said second amplifier; and a fourth sign reversal unity gain amplifier having the input terminals thereof connected to the output terminals of said third amplifier; the output signal of said fourths amplifier being representative of the quotient of the first polynomial divided by the second polynomial.

8. Apparatus for dividing a first polynomial by a second polynomial comprising means for establishing a first electrical signal representative of the first polynomial; a first sign reversal unity gain operational amplifier; a second sign reversal unity gain operational amplifier; means to apply said first signal to the input terminals of said first amplifier; means applying the output terminals of said first amplifier to the input terminals of said second amplifier; means to multiply an electrical signal representative of a polynomial by another polynomial comprising a plurality of voltage multiplying means, a plurality of electrical signal storage means, input terminals, means applying said input terminals successively to said storage means, means to connect said plurality of storage means successively to respective ones of said voltage multiplying means, output terminals, and means to sum the outputs of said voltage multiplying means and to apply same to said output terminals; means to apply the output terminals of said second amplifier to the input terminals of said means to multiply, feedback means to apply the output terminals of said means to multiply to the input terminals of said second amplifier; and feedback means to apply the output terminals of said second amplifier to the input terminals of said first amplifier; the output signal of said second amplifier being representative of the quotient of the first polynomial divided by the second polynomial.

9. Apparatus for dividing a first polynomial $P(x)$ by a second polynomial $Q(x)$ to obtain the quotient $R(x)$ which comprises means for establishing a first electrical signal representative of $P(x)$; a first signal reversal amplifier having a first input resistor and a second feedback resistor; a second signal reversal amplifier having a third feedback resistor; a fourth resistor connected between the output of said first amplifier and the input of said second amplifier; means to multiply an electrical signal representative of a polynomial by another polynomial comprising a plurality of voltage multiplying means, a plurality of electrical signal storage means, input terminals, means applying said input terminals successively to said storage means, means to connect said plurality of storage means successively to respective ones of said voltage multiplying means, output terminals, and means to sum the outputs of said voltage multiplying means and to apply same to said output terminals; means connecting the output terminals of said second amplifier to the input terminals of said means to multiply; and a fifth resistor connected between the output of said means to multiply and the input of said second amplifier; the output of said second amplifier being representative of $R(x)$.

10. The combination in accordance with claim 9 wherein said means to multiply is set to multiply by the expression $[-1+Q(x)]$, the input signal to said first amplifier is $P(x)$, said first and second resistors are equal, and said third, fourth and fifth resistors are equal.

11. The combination in accordance with claim 9 wherein said means to multiply is set to multiply by the expression $[-Q_0+Q(x)]$, the input signal to said first amplifier is $P(x)$, the ratio of said first resistor to said second resistor is $Q_0$, the ratio of said fifth resistor to said third resistor is $Q_0$, and said fourth and fifth resistors are equal.

12. Apparatus for dividing a first polynomial $P(x)$ by a second polynomial $Q(x)$ to obtain the quotient $R(x)$ which comprises means for establishing a first electrical signal representative of $P(x)$; a first signal reversal unity gain amplifier having a first input resistor and a second feedback resistor; a second signal reversal unity gain amplifier having a third feedback resistor; a fourth resistor connected between the output of said first amplifier and the input of said second amplifier; means to multiply an electrical signal representative of a polynomial by another polynomial comprising a plurality of voltage multiplying means, a plurality of electrical signal storage means, input terminals, means applying said input terminals successively to said storage means, means to connect said plurality of storage means successively to respective ones of said voltage multiplying means, output terminals, and means to sum the outputs of said voltage multiplying means and to apply same to said output terminals; means connecting the output terminals of said second amplifier to the input terminals of said means to multiply; a fifth resistor connected between the output of said means to multiply and the input of said second amplifier; a third signal reversal unity gain amplifier having a sixth feedback resistor; a seventh resistor connected between the output of said second amplifier and the input of said third amplifier; a fourth signal reversal amplifier having an eighth feedback resistor; and a ninth resistor connected between the output of said third amplifier and the input of said fourth amplifier; the output of said fourth amplifier being representative of $R(x)$.

13. The combination in accordance with claim 12 wherein the input signal to said first amplifier is $P(x)$, said means to multiply is set to multiply by the expression $[-Q_0+Q(x)]$, said first and second resistors are equal, said sixth and seventh resistors are equal, said fourth and fifth resistors are equal, the ratio of said fifth resistor to said third resistor is $Q_0$, and the ratio of said ninth resistor to said eighth resistor is $Q_0$.

14. The combination in accordance with claim 12 wherein the input signal to said first amplifier is $P(x)$, said means to multiply is set to multiply by the expression $$\left[-1+\frac{Q(x)}{Q_0}\right]$$

said first and second resistors are equal, said sixth and seventh resistors are equal, said third, fourth, and fifth resistors are equal, and the ratio of said ninth resistor to said eighth resistor is $Q_0$.

15. Apparatus for dividing a first polynomial $P(x)$ by a second polynomial $Q(x)$ to obtain the quotient $R(x)$ which comprises means for establishing a first electrical signal representative of $P(x)$; a first sign reversal unity gain amplifier having a first input resistor and a second feedback resistor; a second sign reversal unity gain amplifier having a third feedback resistor; a fourth resistor connected between the output of said first amplifier and the input of said second amplifier; means to multiply an electrical signal representative of a polynomial by the polynomial $Q(x)$ comprising a plurality of voltage multiplying means, a plurality of electrical signal storage means, input terminals, means applying said input terminals successively to said storage means, means to connect said plurality of storage means successively to respective ones of said voltage multiplying means, output terminals, and means to sum the outputs of said voltage multiplying means and to apply same to said output terminals; a fifth resistor connected between the output of said means to multiply and the input of said second amplifier; and a sixth resistor connected between the output of said second amplifier and the input of said first amplifier; said first, second and sixth resistors being equal; and said third, fourth and fifth resistors being equal; the output of said second amplifier being representative of $R(x)$.

References Cited in the file of this patent
UNITED STATES PATENTS

| | | |
|---|---|---|
| 2,794,865 | Yost | June 4, 1957 |
| 2,855,147 | Greening | Oct. 7, 1958 |
| 2,908,889 | Piety | Oct. 13, 1959 |
| 2,921,738 | Greening | Jan. 19, 1960 |

OTHER REFERENCES

Electronic Analog Computers (Korn and Korn, 1952, page 14.

Electronic Analog Computers (Korn and Korn), 1952, pages 232, 226 and 227.

A Pulse-Operated Auto-Correlator (Stoneman), December 1952, pages 2 and 3.

Analog Methods in Computation and Simulation (Soroka), page 92, 1954 (McGraw-Hill).